(No Model.)
J. F. DAVEY.
DEVICE FOR TAPPING BEER AND OTHER BARRELS.
No. 289,075. Patented Nov. 27, 1883.
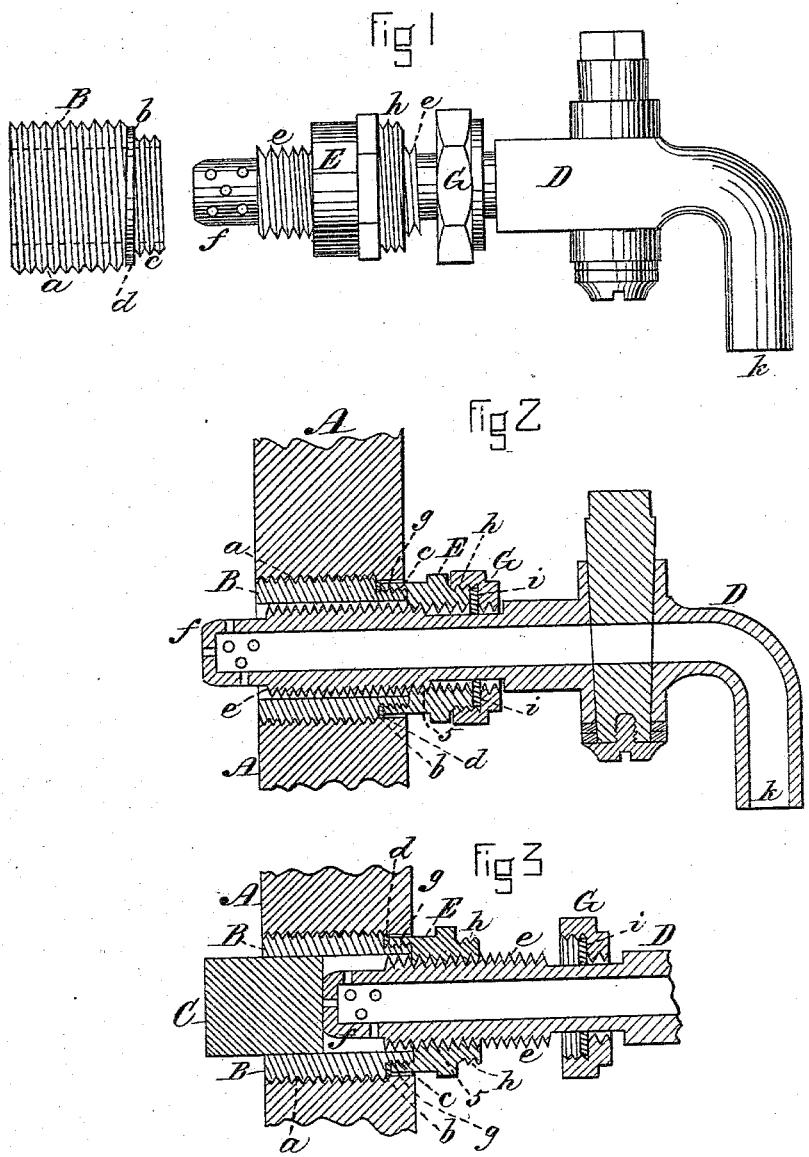
WITNESSES
W. J. Cambridge
Chas. E. Griffin
INVENTOR
John F. Davey
per F. E. Teschemacher
Atty

UNITED STATES PATENT OFFICE.

JOHN F. DAVEY, OF MARLBOROUGH, MASSACHUSETTS, ASSIGNOR TO HIMSELF, MICHAEL J. MAHONEY, AND MICHAEL BURKE, JR., ALL OF SAME PLACE.

DEVICE FOR TAPPING BEER AND OTHER BARRELS.

SPECIFICATION forming part of Letters Patent No. 289,075, dated November 27, 1883.

Application filed June 22, 1883. (No model.)

*To all whom it may concern:*

Be it known that I, JOHN F. DAVEY, a citizen of the United States, residing at Marlborough, in the county of Middlesex and State of Massachusetts, have invented an Improvement in Devices for Tapping Beer and other Barrels, of which the following is a full, clear, and exact description, reference being had to the accompanying drawings, making part of this specification, in which—

Figure 1 is a side elevation of a beer-faucet and the bushing which is applied to the head of the barrel, both constructed in accordance with my invention. Fig. 2 is a vertical section through the faucet applied to the head of a beer-barrel provided with my improved bushing. Fig. 3 is a section representing the rear portion of the faucet inserted within the bushing, illustrating the manner in which the wooden plug is driven through the bushing by the faucet.

My invention relates to certain improvements in faucets for barrels or casks containing beer or other liquid under pressure, and also in the bushing which is applied to the head of the barrel and used in connection with said faucet; and my invention consists in the combination, with a bushing having an exterior screw-thread and a perfectly-smooth interior from end to end, and adapted to contain a plug driven tightly therein, of a faucet provided with a rearwardly-extending threaded stem or portion, over which is screwed a coupling-nut having a second interior thread at its inner end, whereby it is adapted to screw over the outside of the end of the bushing in the barrel-head, and thus hold the faucet in place while the latter is being screwed in to force the wooden plug through the bushing, the coupling-nut having a screw-thread on the outside of its front end, over which is fitted a screw-cap provided with a packing, thus forming a stuffing-box at this point to prevent leakage, which enables the faucet to be always tight when the discharge-outlet is turned in the desired position for use, which would not always be the case if it were turned up against a shoulder.

In the said drawings, A represents the head of a beer-barrel, within which is inserted a metallic bushing, B, having an exterior screw-thread, *a*, its outer end being turned down, forming a shoulder, *b*, the front end, which is of smaller diameter, having a second exterior screw-thread, *c*. An annular recess is thus formed around the front end of the bushing when in place within the head A, in which is preferably placed a packing-ring, *d*, of leather, rubber, or other suitable material. Within the interior of the bushing, which is perfectly smooth from one end to the other, is driven a wooden plug, C, which swells, as usual, at the inner end, and thus prevents the escape of the contents of the barrel.

D represents the faucet, which is provided at its rear with a long threaded stem or neck, *e*, the closed outer end, *f*, of which is perforated to form a strainer for the beer or other liquid. Over the thread of the stem *e* is screwed a coupling-nut, E, having an interior screw-thread, 5, the inner end of which is enlarged on the inside and provided with a second interior screw-thread, *g*, which is adapted to screw over the thread *c* on the outside of the bushing B, thus coupling the faucet D thereto, the packing-ring *d* forming a perfectly-tight joint. The faucet D can now be screwed in through the coupling-nut E, causing the end *f* to force the wooden plug C through the bushing B into the barrel, when the beer will be free to enter the faucet through the perforations in the end *f*.

To prevent leakage at the front end of the coupling-nut E, the latter is provided at its front end with an exterior screw-thread, *h*, over which is screwed a cap or nut, G, which is adapted to slide on the smooth portion of the stem *e*, and is provided on its inside with a packing-ring, *i*, thus forming a stuffing-box at this point for the stem *e* of the faucet, which is an advantage of much importance, as it enables the faucet, after the plug C has been forced out of the bushing, to be turned to bring its discharge-outlet *k* into any position required, and the joint between the stem *e* and the coupling-nut E then made tight to prevent leakage by screwing up the packing-nut G, whereas, if the faucet were made tight by screwing up against a shoulder, the discharge-outlet $k$ might not always be turned into the right position when a tight joint was made in this manner. The front end of the nut G, which is of smaller internal diameter than the rear end, is provided with a screw-thread to enable it to be turned over the thread of the stem $e$ of the faucet D when it is desired to apply the nut G thereto or remove it therefrom.

Another great advantage incident to my improved construction is that the bushing B is perfectly smooth on the inside from end to end, instead of having a screw-thread therein, as heretofore, for the end of the faucet to engage with, this screw-thread on the inside of the bushing being objectionable on account of its liability to become filled up and obstructed by dirt, &c., in transporting the barrel from place to place, requiring time to clean it out; and if a cap is employed to cover the end of the bushing it is liable to soon become lost or misplaced.

I am aware that a bushing has been screwed into the head of a barrel and provided with a plug adapted to be forced inward by the advance of the end of the faucet, which engaged with a screw-thread on the inside of the bushing, or a thimble applied thereto, as described in the United States Letters Patent No. 157,618, granted to John F. Mantey, December 8, 1874; and I am also aware of the United States Patent of Hermann Müller, of June 18, 1878, No. 205,123, in which the tubular screw-shank of the faucet passes through a screw-box having a sliding plate adapted to fit between or engage with locking strips or guides attached to the outside of the head of the barrel, on opposite sides of the tap-hole. I therefore lay no broad claim to a bushing containing a plug adapted to be forced inward by the advance of a faucet, nor to any of the devices or construction shown in either of the aforesaid patents.

What I claim as my invention, and desire to secure by Letters Patent, is—

1. The combination, with a bushing, B, having an exterior screw-thread and a smooth interior surface from end to end, and adapted to contain a plug, C, of the faucet D, having a threaded stem, $e$, and the coupling-nut E, turning thereover, and provided at its inner end with an interior screw-thread, $g$, adapted to screw over a corresponding thread upon the outside of the end of the bushing B, all constructed to operate substantially in the manner and for the purpose set forth.

2. The combination, with a bushing, B, having an exterior screw-thread and a smooth interior surface from end to end, and adapted to contain a plug, C, of the faucet D, having a threaded stem, $e$, the coupling-nut E, turning thereon, and provided with a second interior screw-thread, $g$, at its inner end, adapted to fit over the outside of the end of the bushing B, and the cap or nut G, applied to the stem $e$ of the faucet, and adapted to be screwed to the front end of the coupling-nut E, and provided with a packing-ring, $i$, all constructed to operate substantially in the manner and for the purpose set forth.

Witness my hand this 16th day of June, A. D. 1883.

JOHN F. DAVEY.

In presence of—
 MICHAEL QUIRK,
 THOMAS E. CAMPBELL.